US010375096B2

(12) United States Patent
Machlica et al.

(10) Patent No.: US 10,375,096 B2
(45) Date of Patent: Aug. 6, 2019

(54) FILTERING ONION ROUTING TRAFFIC FROM MALICIOUS DOMAIN GENERATION ALGORITHM (DGA)-BASED TRAFFIC CLASSIFICATION

(71) Applicant: Cisco Technology, Inc., San Jose, CA (US)

(72) Inventors: Lukas Machlica, Prague (CZ); Martin Vejman, Litomysl (CZ)

(73) Assignee: Cisco Technology, Inc., San Jose, CA (US)

( * ) Notice: Subject to any disclaimer, the term of this patent is extended or adjusted under 35 U.S.C. 154(b) by 138 days.

(21) Appl. No.: 15/372,580

(22) Filed: Dec. 8, 2016

(65) Prior Publication Data

US 2018/0167404 A1 Jun. 14, 2018

(51) Int. Cl.
*H04L 29/06* (2006.01)
*H04L 12/26* (2006.01)

(52) U.S. Cl.
CPC .......... *H04L 63/1425* (2013.01); *H04L 43/08* (2013.01); *H04L 43/16* (2013.01); *H04L 63/1441* (2013.01)

(58) Field of Classification Search
CPC . H04L 63/1425; H04L 63/1441; H04L 43/08; H04L 43/16
See application file for complete search history.

(56) References Cited

U.S. PATENT DOCUMENTS 8,260,914 B1 9/2012 Ranjan
8,516,585 B2 8/2013 Cao et al.
2013/0191915 A1* 7/2013 Antonakakis ........... H04L 63/14 726/23
2016/0381070 A1* 12/2016 Zhang ................ H04L 63/1466 726/23

FOREIGN PATENT DOCUMENTS

CN 105897714 A 8/2016

OTHER PUBLICATIONS

Astika, "Detecting and blocking onion router traffic using deep packet inspection", Research gate, Sep. 2016, pp. 1-7 https://www.researchgate.net/publication/313951935_Detecting_and_blocking_onion_router_traffic_using_deep_packet_inspection (Year: 2016).*

(Continued)

*Primary Examiner* — Jung W Kim
*Assistant Examiner* — Carlos M De Jesus Lassala
(74) *Attorney, Agent, or Firm* — Behmke Innovation Group LLC; James Behmke; Stephen D. LeBarron

(57) ABSTRACT

In one embodiment, a device in a network receives domain information from a plurality of traffic flows in the network. The device identifies a particular address from the plurality of traffic flows as part of an onion routing system based on the received domain information. The device distinguishes the particular address during analysis of the traffic flows by a traffic flow analyzer that includes a domain generation algorithm (DGA)-based traffic classifier. The device detects a malicious traffic flow from among the plurality of traffic flows using the traffic flow analyzer. The device causes performance of a mitigation action based on the detected malicious traffic flow.

20 Claims, 15 Drawing Sheets

(56) References Cited

OTHER PUBLICATIONS

Yadav et al., "Detecting Algorithmically Generated Malicious Domain Names" Nov. 2010, ACM Digital Library, pp. 48-61, https://dl.acm.org/citation.cfm?id=1879148 (Year: 2010).*
Prenosil, "Tor-based Malware and Tor Connection Detection" Nov. 2014, ResearchGate, pp. 1-7, file:///C:/Users/cdejesus/Downloads/Tor-BasedMalwareandTorConnectionDetectionfinalversion.pdf (Year: 2014).*
Antonakakis et al., "From Throw-Away traffic to Bots: Detecting the rise of DGA-Based Malware," Jun. 2012, pp. 1-7, https://www.usenix.org/systern/files/conference/usenixsecurity12/sec12-final127.pdf (Year: 2012).*
Victor, "The Onion Name System: Tor-powered Distributed DNS for Tor Hidden Services," 2015, pp. 1-73, https://digitalcommons.usu.edu/cgi/viewcontent.cgi?referer=&httpsredir=1&article=5517&context=etd (Year: 2015).*
Yadav, et al., "Detecting Algorithmically Generated Domain-Flux Attacks with DNS Traffic Analysis", IEEE/ACM Transactions on Networking (TON), vol. 20 Issue 5, Oct. 2012, 15 pages, IEEE Press.
McCoy et al. "Shining Light in Dark Places: Understanding the Tor Network" pp. 1-14.

* cited by examiner

700

710

720

730

FILTERING ONION ROUTING TRAFFIC FROM MALICIOUS DOMAIN GENERATION ALGORITHM (DGA)-BASED TRAFFIC CLASSIFICATION

TECHNICAL FIELD

The present disclosure relates generally to computer networks, and, more particularly, to filtering onion routing traffic from malicious domain generation algorithm (DGA)-based traffic classification.

BACKGROUND

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
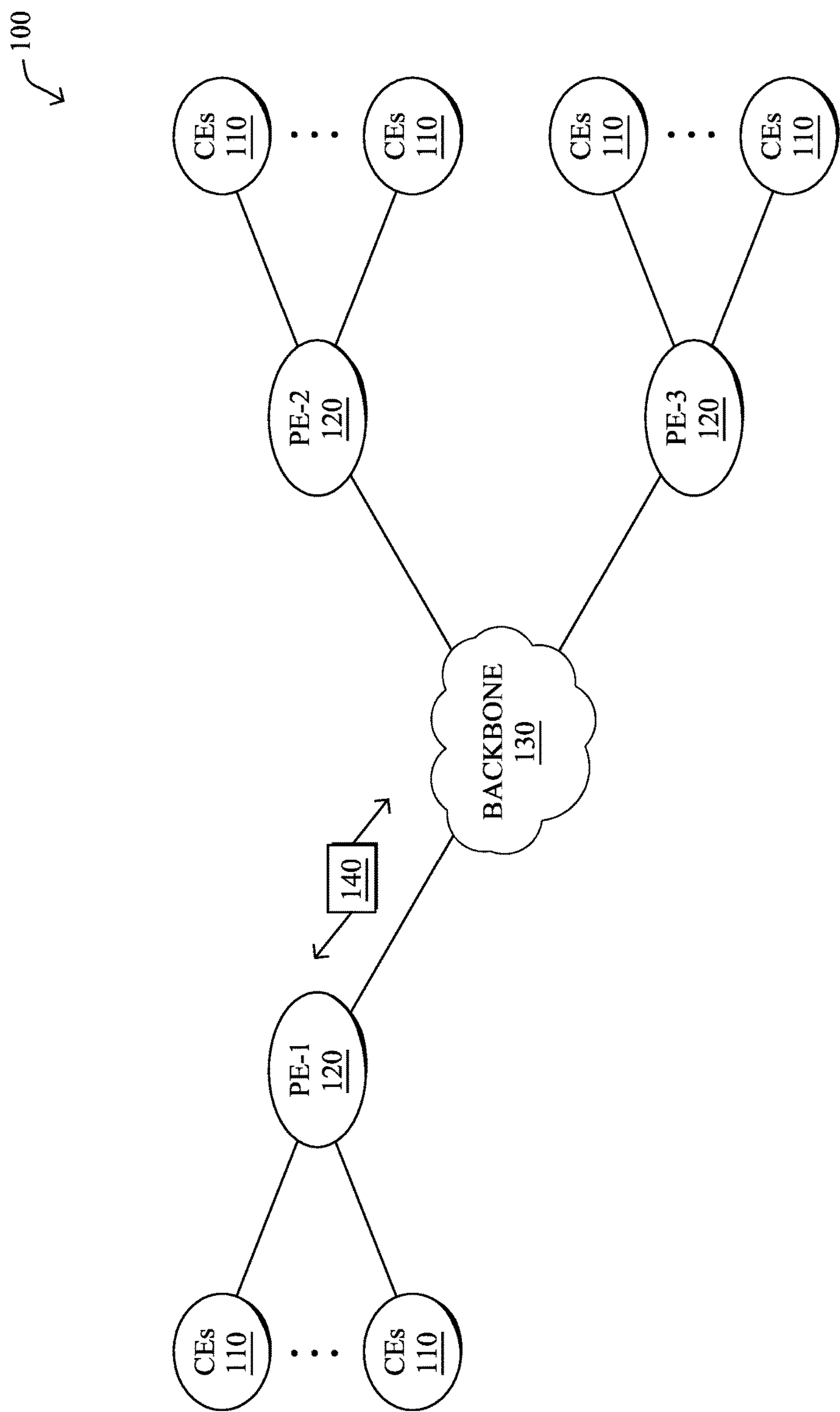
FIGS. 1A-1B illustrate an example communication network.

According to one or more embodiments of the disclosure, a device in a network receives domain information from a plurality of traffic flows in the network. The device identifies a particular address from the plurality of traffic flows as part of an onion routing system based on the received domain information. The device distinguishes the particular address during analysis of the traffic flows by a traffic flow analyzer that includes a domain generation algorithm (DGA)-based traffic classifier. The device detects a malicious traffic flow from among the plurality of traffic flows using the traffic flow analyzer. The device causes performance of a mitigation action based on the detected malicious traffic flow.

Description

According to one or more embodiments of the disclosure, a device in a network receives traffic data regarding one or more traffic flows in the network. The device applies a machine learning classifier to the traffic data. The device determines a priority for the traffic data based in part on an output of the machine learning classifier. The output of the machine learning classifier comprises a probability of the traffic data belonging to a particular class. The device stores the traffic data for a period of time that is a function of the determined priority for the traffic data.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
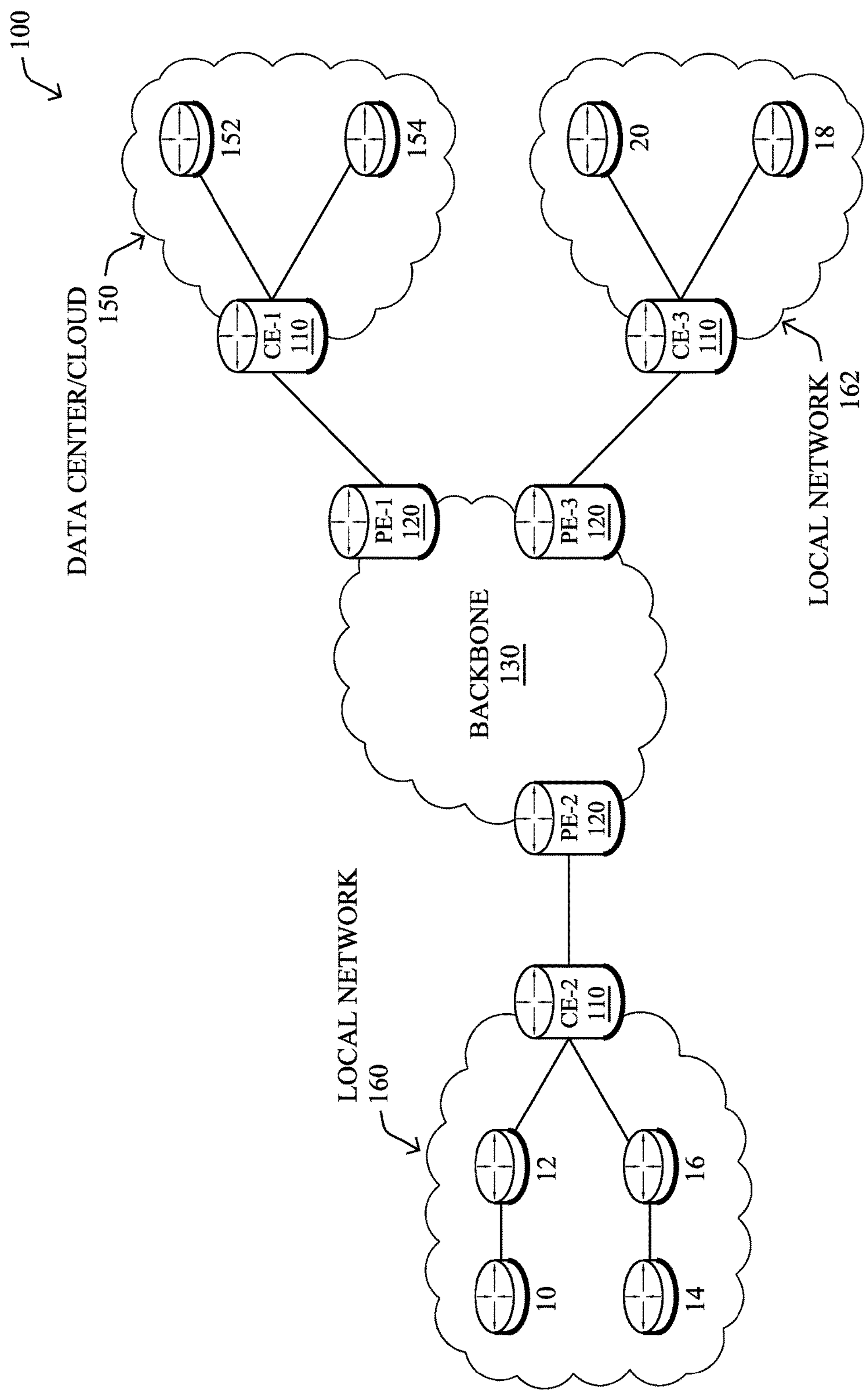

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
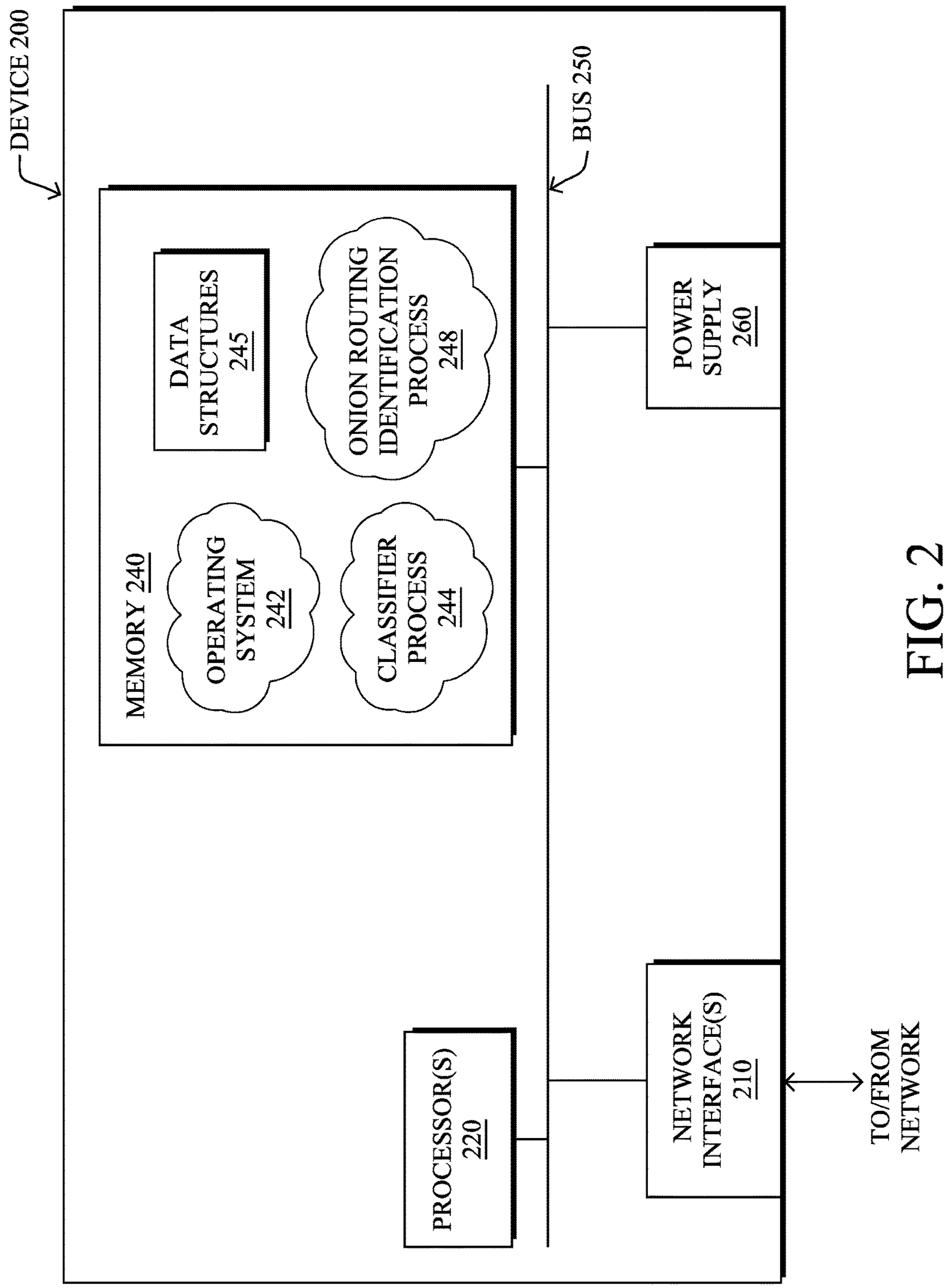
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise classifier process 244 and/or an onion routing identification process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, classifier process 244 may execute one or more machine learning-based classifiers to classify traffic data regarding traffic in the network for any number of purposes. In one embodiment, classifier process 244 may assess captured traffic data to determine whether a given traffic flow or set of flows are caused by malware in the network (e.g., whether the traffic flow is considered malicious). Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, classifier process 244 may classify the gathered traffic data to detect other anomalous behaviors (e.g., malfunctioning devices, misconfigured devices, etc.), traffic pattern changes (e.g., a group of hosts begin sending significantly more or less traffic), or the like.

Classifier process 244 may employ any number of machine learning techniques, to classify the gathered traffic data. In general, machine learning is concerned with the design and the development of techniques that receive empirical data as input (e.g., traffic data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function is a function of the number of misclassified points. The learning process then operates by adjusting the parameters a,b,c such that the number of misclassified points is minimal. After this optimization/learning phase, classifier process 244 can use the model M to classify new data points, such as information regarding new traffic flows in the network. Often, M is a statistical model, and the cost function is inversely proportional to the likelihood of M, given the input data.

In various embodiments, classifier process 244 may employ one or more supervised, unsupervised, or semi-supervised machine learning models. Generally, supervised learning entails the use of a training set of data, as noted above, that is used to train the model to apply labels to the input data. For example, the training data may include sample traffic data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that classifier process 244 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, classifier process 244 may assess the captured traffic data on a per-flow basis. In other embodiments, classifier process 244 may assess traffic data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Onion routing identification process 248, as described in greater detail below, may operate in conjunction with classifier process 244. For example, onion routing identification process 248 may identify whether a particular network address and its corresponding traffic flows are associated with an onion routing system/network. In other words, classifier process 244 and onion routing identification process 248 may function together as part of a traffic flow analyzer that assesses traffic flows in the network (e.g., to detect flows that are potentially malicious/related to malware). In turn, device 200 may cause the performance of any number of mitigation actions with respect to a detected malicious flow, either directly or indirectly, such as dropping/blocking the flow, generating an alert, or the like.

Figure 3:
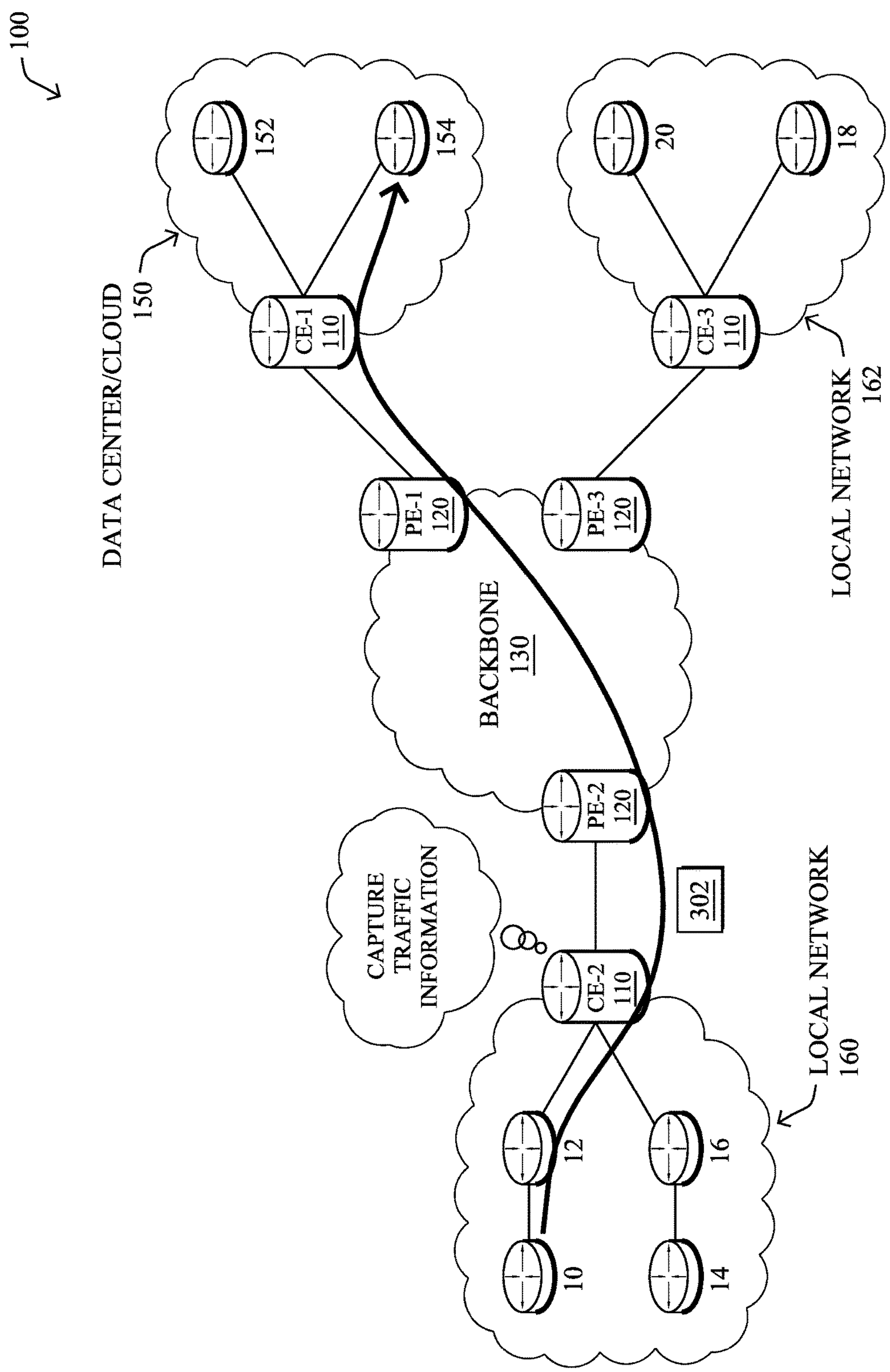
FIG. 3 illustrates an example of a network device capturing traffic data.

As shown in FIG. 3, various mechanisms can be leveraged to capture information about traffic in a network. For example, consider the case in which host node 10 initiates a traffic flow with remote server 154 that includes any number of packets 302. Any number of networking devices along the path of the flow may analyze and assess packet 302, to capture traffic data regarding the traffic flow. For example, as shown, consider the case of edge router CE-2 through which the traffic between node 10 and server 154 flows.

In some embodiments, a networking device may analyze packet headers, to capture information about the traffic flow. For example, router CE-2 may capture the source address and/or port of host node 10, the destination address and/or port of server 154, the protocol(s) used by packet 302, or other header information by analyzing the header of a packet 302. In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the traffic data may also compute any number of statistics or metrics regarding the traffic flow. For example, CE-2 may determine the start time, end time, duration, packet size(s), the distribution of bytes within a flow, etc., associated with the traffic flow by observing packets 302. In turn, the capturing device may itself perform analysis of the traffic flows (e.g., to detect malicious/malware-related flows) or provide the captured traffic data to another device in the network that performs such an analysis.

As noted above, botnets represent a security concern for network administrators. Once a client device has been infected with malware for the botnet, it may communicate with a command and control (C&C) server which sends control commands to the infected device. If the address of the C&C server is hardcoded into the malware itself, preventing operation of the botnet becomes a trivial task. Notably, all an administrator would need to do is block the address of the C&C server, to defeat control over the infected client device. However, many modern forms of malware do not use hardcoded addresses, but instead rely on domain generation algorithms (DGAs), to elude detection. Similar mechanisms are also used by other forms of malware, such as those that exfiltrate data from a network and the like.

In general, a DGA is a mechanism that generates a set of domain names based on some criteria, such as the time of day, month, year, etc. For example, a DGA may generate the domain names {a.com, b.com, a.b.com, . . . } on one day and the domains {bc.com, b.info, . . . } on the next day. In turn, the infected client device may perform a lookup of some or all of the generated domain names, to obtain the IP address of the C&C server.

Figure 4A:
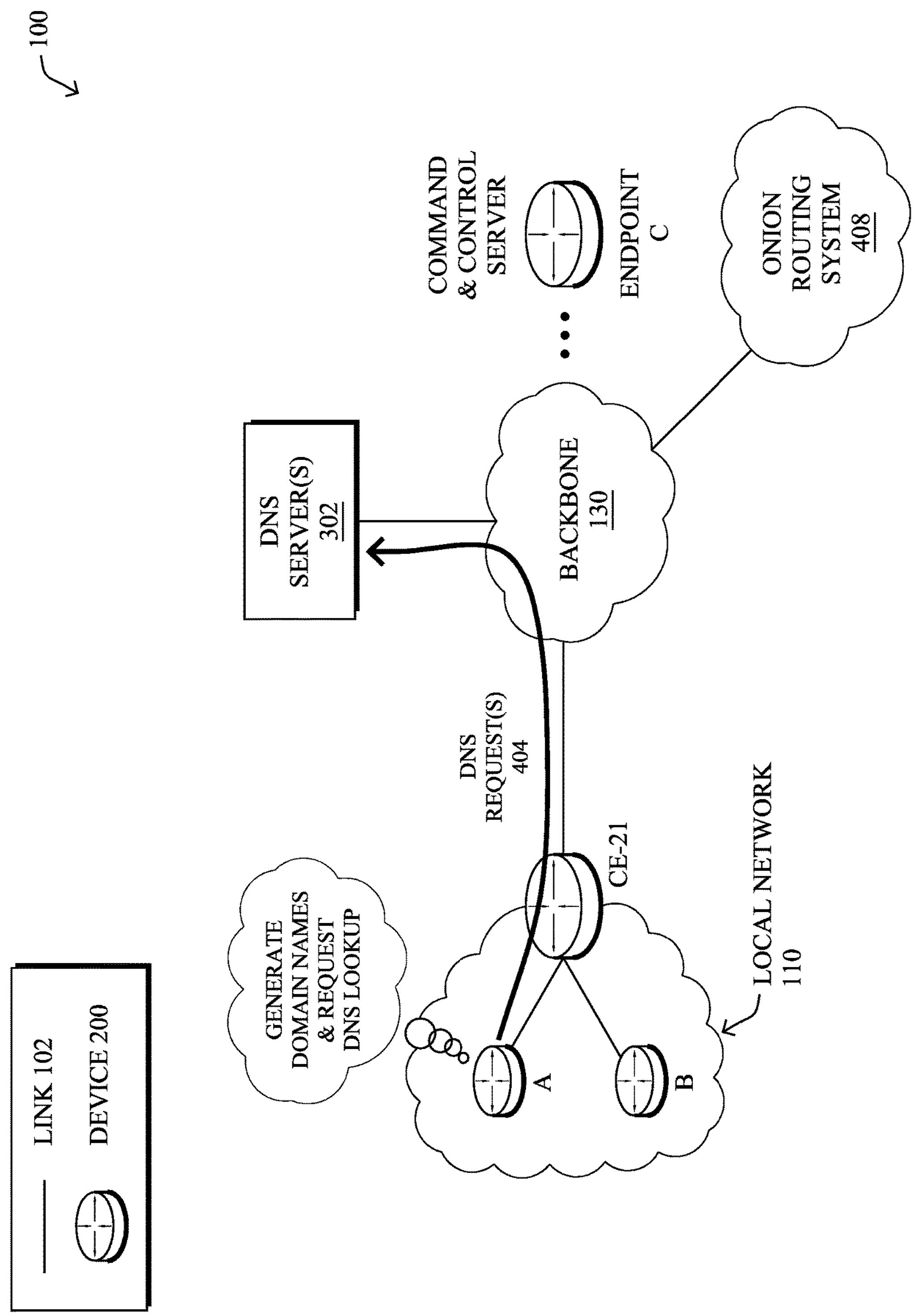
FIGS. 4A-4B illustrate an example of a network device capturing domain information.
Figure 4B:
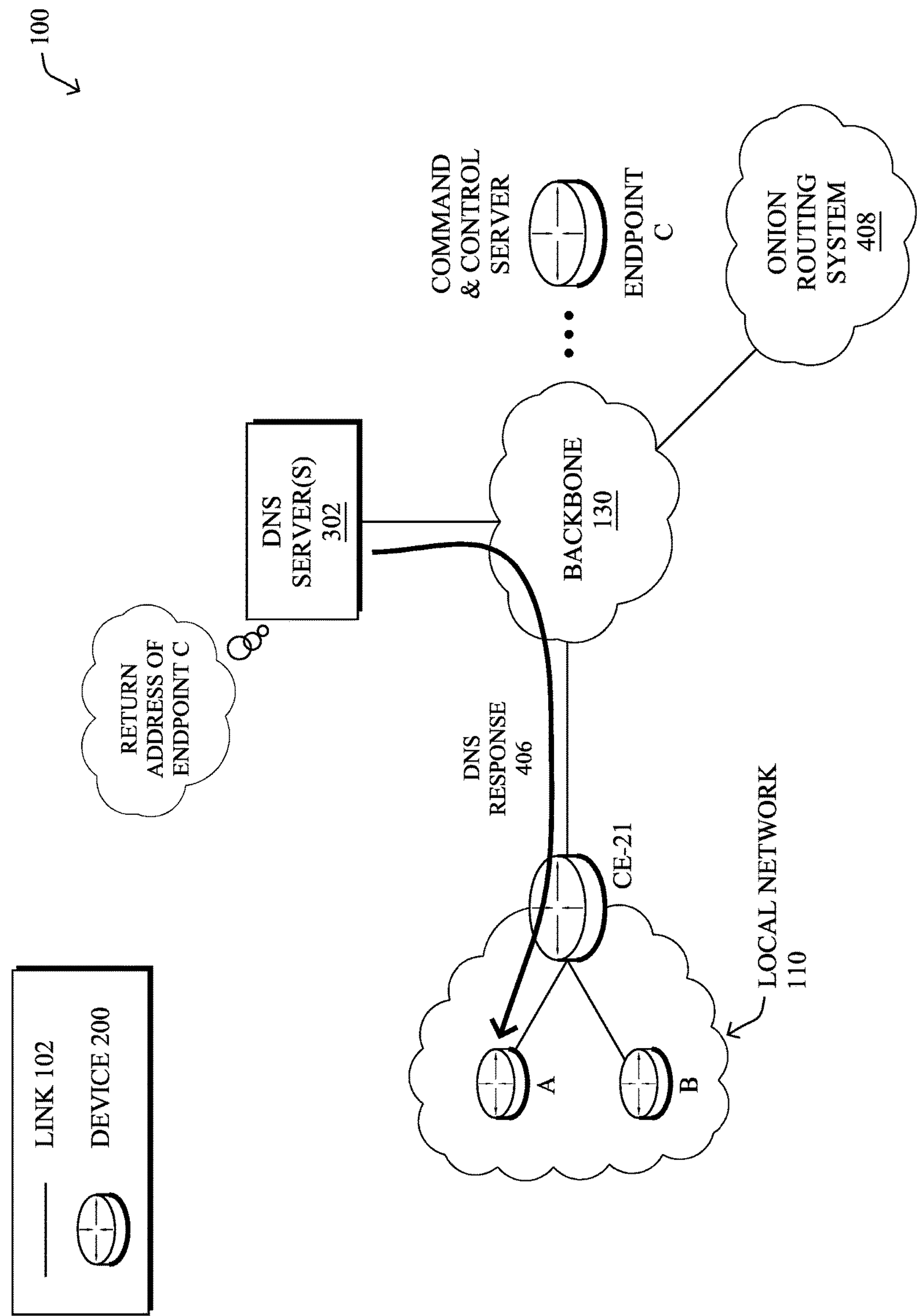

FIGS. 4A-4B illustrate an example of a domain name system (DNS) lookup. As shown, assume that client device A has been infected with malware that uses a DGA to communicate with a corresponding C&C server, endpoint device C shown. During operation, both infected client device A and endpoint C may execute a DGA to generate a corresponding set of domain names. In turn, endpoint C or the entity associated therewith may register one or more of the generated domain names with a DNS service (e.g., to associate the IP address of endpoint C with a generated domain name). Infected client device A may then send one or more DNS requests 406 to a DNS service provided by DNS server(s) 402, to look up the IP address associated with one or more of the generated domain names, as shown in FIG. 4A. This allows the C&C server to constantly switch IP addresses to avoid blocking mechanism and still retain control over the infected client devices. In turn, as shown in FIG. 4B, CE-2 may capture this domain information by analyzing DNS response 406 and/or by assessing the ensuing traffic directly.

According to various embodiments, a flow analyzer may employ the use of one or more DGA-based classifiers, to identify traffic flows that are potentially malicious/malware-related. Such a classifier may, for example, assess the domain name information for a particular flow, to label the flow as either "benign" or "malicious." The traffic flow analyzer may further employ other classifiers (e.g., based on other traffic characteristics) and/or rule-based approaches, to make a final determination about the flow.

While DGA-based classification may be a powerful way to identify traffic flows that are associated with malware, not all DGA-like domain names are necessarily related to malware. One example of this is in the case of onion routing systems, most notably The Onion Router (TOR) network, although other onion routing systems are also in use. In general, onion routing systems afford anonymous communications by implementing the following features: 1.) communications are wrapped in multiple layers of encryption, 2.) each node along the path is only able to strip off the topmost layer of encryption to identify the next destination, 3.) each node along the path is unable to determine whether the prior hop was the originator of the communication, and 4.) each node along the path is further unable to determine whether the next hop is the final destination.

To further obfuscate communications in an onion routing system, it has been found that the domain names observed in TOR-related traffic are also generated automatically and never registered. This is very similar to the DGAs used by malware-related traffic flows and potentially acting as a source of false positives by a traffic flow analyzer that uses a DGA-based classifier. For example, as shown in FIGS. 4A-4B, traffic flows associated with onion routing system 408 may exhibit domain name information that resembles DGA-generated domain names that are associated with malware.

Filtering Onion Routing Traffic from Malicious DGA-Based Traffic Classification

The techniques herein allow for the identification of addresses/servers that are dedicated to onion routing systems in a way that is data driven and does not rely on static lists of addresses. In some aspects, this identification can be used to reduce false positives by a traffic analyzer that uses a DGA-based classifier to detect malware-related traffic flows.

Specifically, according to one or more embodiments of the disclosure as described in detail below, a device in a network receives domain information from a plurality of traffic flows in the network. The device identifies a particular address from the plurality of traffic flows as part of an onion routing system based on the received domain information. The device distinguishes the particular address during analysis of the traffic flows by a traffic flow analyzer that includes a domain generation algorithm (DGA)-based traffic classifier. The device detects a malicious traffic flow from among the plurality of traffic flows using the traffic flow analyzer. The device causes performance of a mitigation action based on the detected malicious traffic flow.

Illustratively, the techniques described herein may be performed by hardware, software, and/or firmware, such as in accordance with classifier process 244 and onion routing identification process 248, which may include computer executable instructions executed by the processor 220 to perform functions relating to the techniques described herein.

Operationally, the techniques herein are able to identify IP addresses used by an onion routing system based on the analysis of traffic associated with a given server IP address. The techniques rely on the observation that one server IP, dedicated to use by the onion routing system, primarily operates for onion routing purposes. In other words, no other domains, or only a very small percentage given all of the observed DGA-generated domains, are registered on such servers. Conversely, malware typically spreads the registration of its DGAs over many different servers, to avoid blacklisting of the server IPs. Moreover, other malicious or legitimate non-DGA domains are often registered at these servers as well.

A further key observation is that onion routing-related domains have uniform probability distribution of characters given one server IP, that can be computed if sufficient amount of observed domains is available. This is not true for distribution of characters in domain names related to non-onion routing servers. Since each connection to an onion routing-related server uses a unique domain name, the number of different domains observed at a specific onion routing dedicated server is high.

According to various embodiments, the traffic analyzer may identify an onion routing-related address/server by performing any or all of the following:

1. Gather all domains related to IP addresses for which a DGA was detected.
2. Given an observed domain related to a server IP in question, update a histogram for this IP with the number of occurrences of different characters in the domain name. All connections in which the domain is given by IP can also be ignored, since these are of no importance.
3. After a sufficient amount of domains to a specific IP has been collected, compute the distance from the uniform distribution (e.g. entropy or flatness of the distribution) based on the histogram of character occurrences (i.e., the estimated probability distribution of characters related to one server IP).
4. If the distance is lower (or entropy is higher) than a pre-specified threshold then add the server IP to the set of onion routing-related IPs.

Instead of focusing on each individual domain separately, all of the domains related to one server IP are investigated at once, in one embodiment. Note that the histogram for one IP is updated each time a domain is observed, i.e., there is no need to store all previously processed domains in memory. Further embodiments provide for the storage and analysis of the individual domains.

FIGS. 5A-5D and 6A-6D illustrate example histograms of character distributions from domain names associated with non-onion routing traffic and onion routing traffic, respectively. Each histogram shown also depicts a different scenario. More specifically, for the two types of traffic, example character distributions are depicted for 5, 10, 100, and 300 domains for a single server IP address.

Figure 5A:
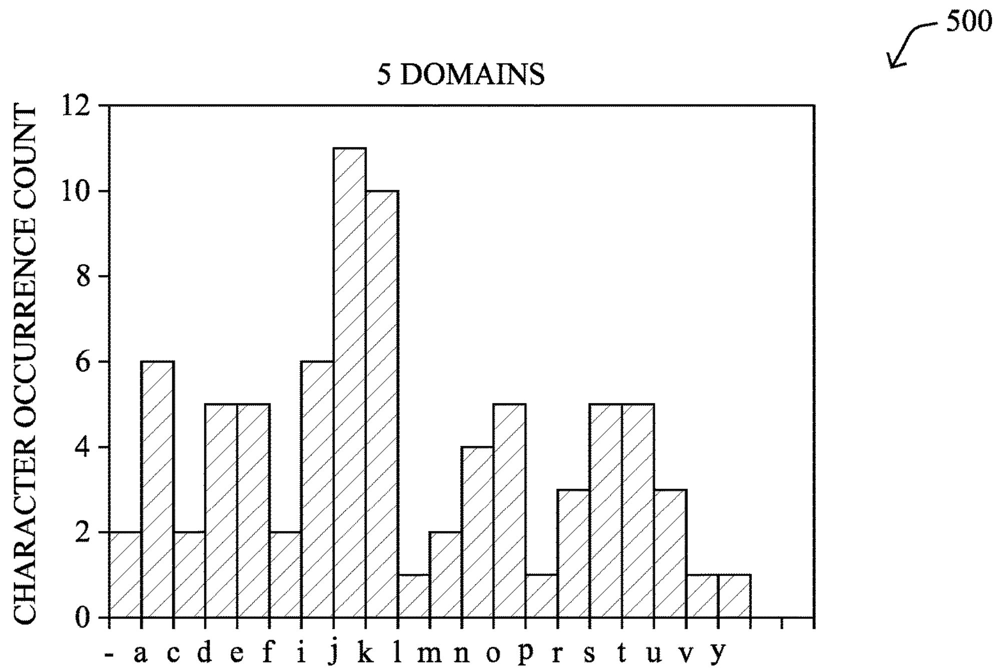
FIGS. 5A-5D illustrate example histograms of character distributions from domain names associated with non-onion routing traffic.
Figure 5B:
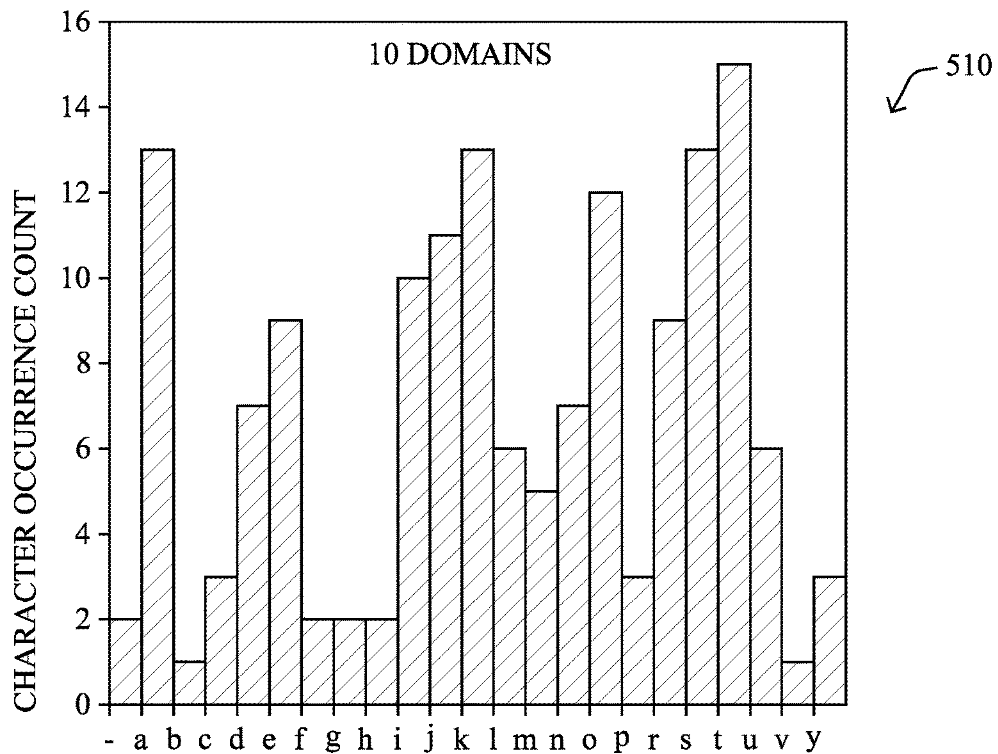
Figure 5C:
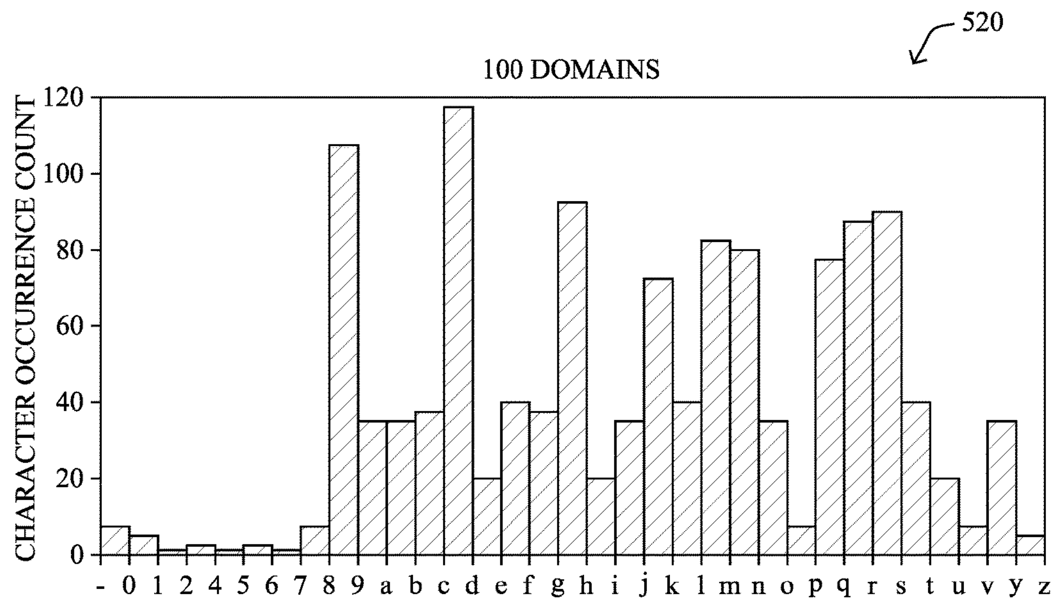
Figure 5D:
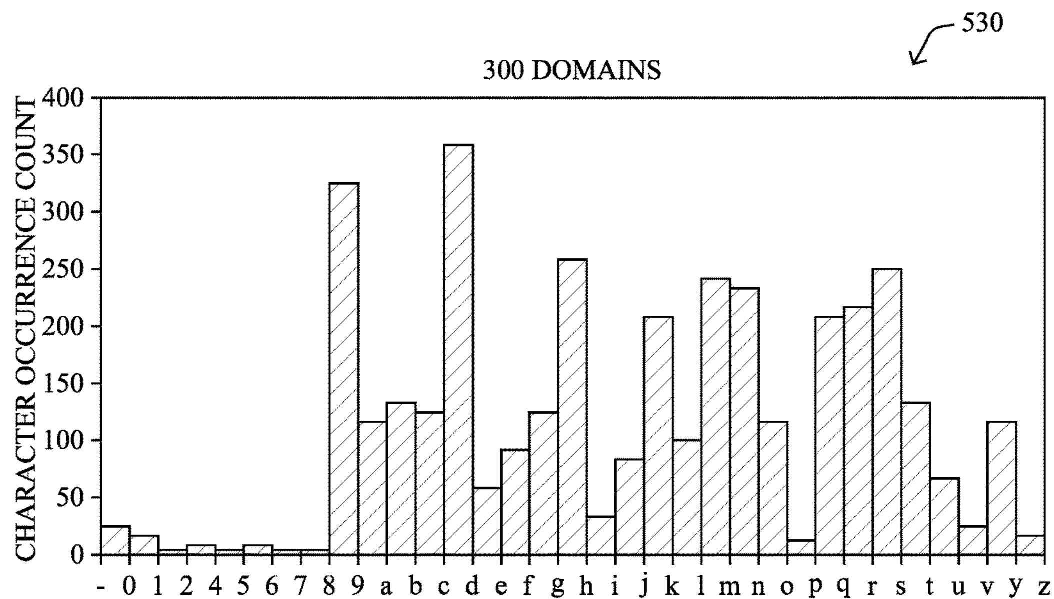

More specifically, FIG. 5A illustrates a histogram 500 of the character counts of five domain names for a non-onion routing related IP address. FIG. 5B illustrates a histogram 510 of the character counts of ten domain names for the address. FIG. 5C illustrates a histogram 520 of the character counts of one hundred domains for the address. Finally, FIG. 5D illustrates a histogram 530 of the character counts of three hundred domains for the non-onion routing-related address.

Figure 6A:
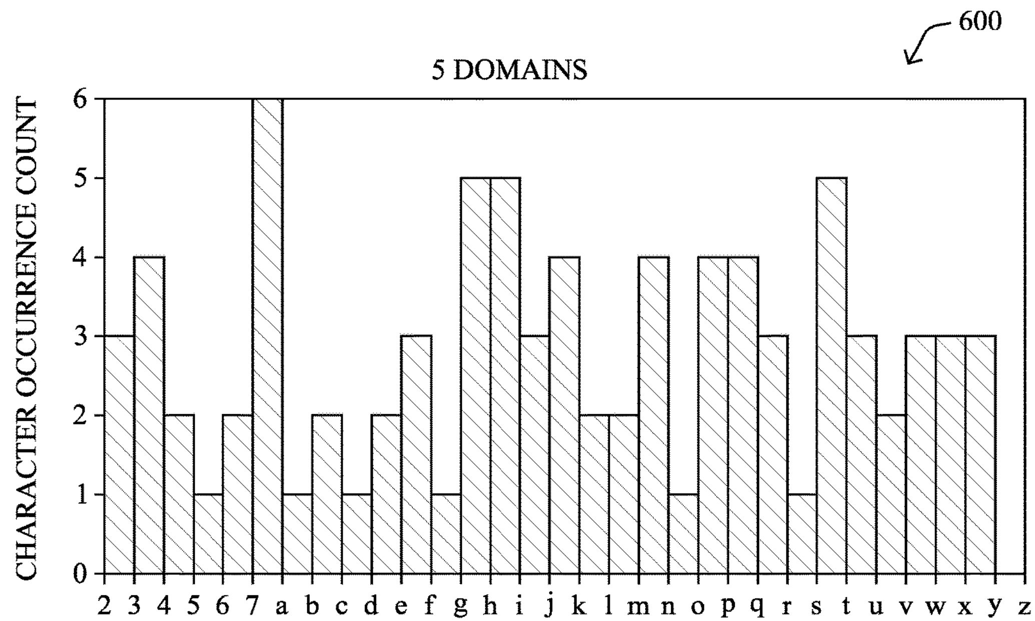
FIGS. 6A-6D illustrate example histograms of character distributions from domain names associated with onion routing traffic.
Figure 6B:
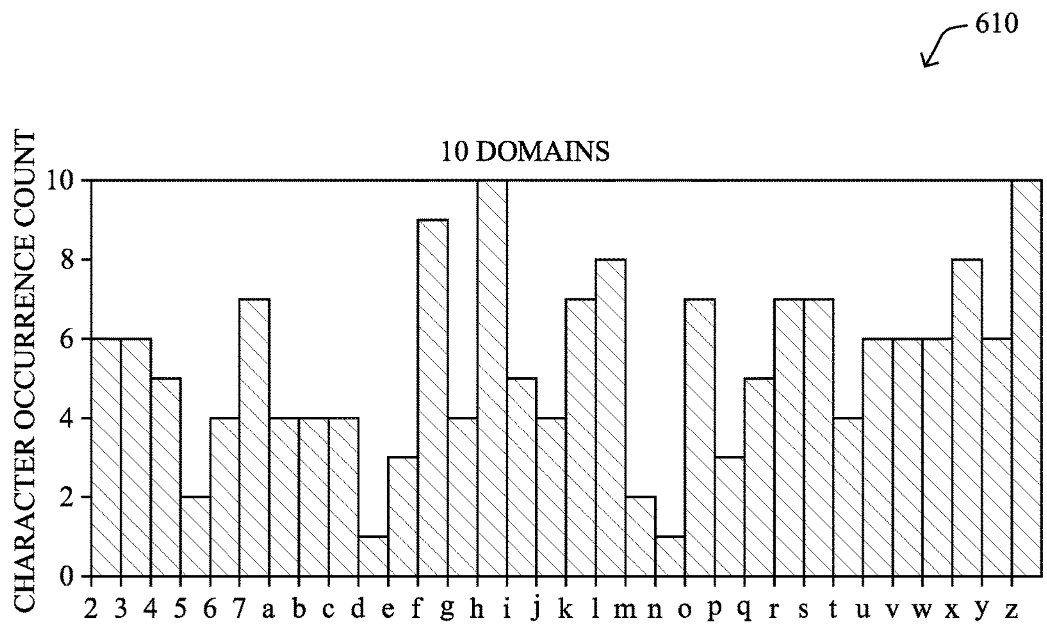
Figure 6C:
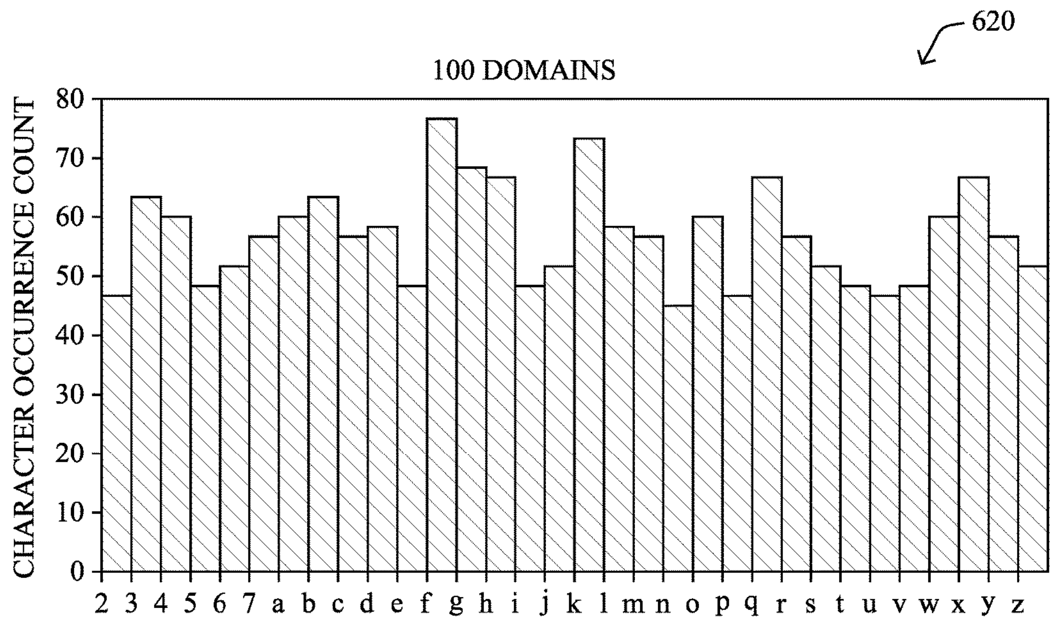
Figure 6D:
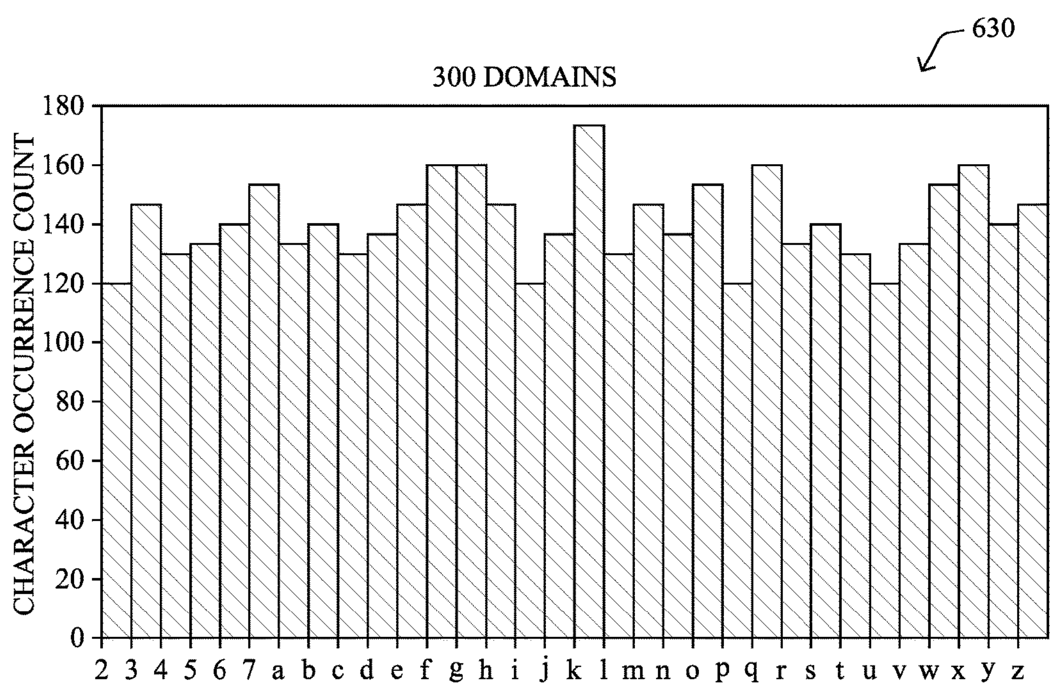

Conversely, FIG. 6A illustrates a histogram 600 of the character counts of five domain names for an onion routing-related IP address. FIG. 6B illustrates a histogram 610 of the character counts of ten domain names for the address. FIG. 6C illustrates a histogram 620 of the character counts of one hundred domains for the address. Finally, FIG. 6D illustrates a histogram 630 of the character counts of three hundred domains for the onion routing-related address.

From FIGS. 5A-5D, one observation is that for non-onion routing related addresses, peaks begin to form at the position of vowels as the number of domains increases. This may be due to the server IP addresses hosting not only DGA-generated domains, but also many other non-DGA-generated domains that are formed from ordinary words. In addition, the number of occurrences of non-alphabetic characters is also very low (e.g., numbers, symbols, etc.).

From FIGS. 6A-6D, another observation is that the distribution of character counts for domains associated with the onion routing related IP appears to converse to a uniform distribution, as the number of domains increases. One can see that the alphabetic and numerical characters have a comparable number of occurrences even for low number of domains observed for the server IP address. Still, this fact alone does not have to be indicative enough for the server IPs in question.

Thus, by calculating the distance between the actual character count distribution and a uniform distribution, the traffic analyzer may be able to identify those IP addresses that are associated with an onion routing system/network. In turn, this information can be used to reduce false positives by the DGA-based traffic classifier. In some embodiments, for example, the traffic analyzer may simply bypass analysis of a traffic flow associated with an IP address that has been identified as part of an onion routing system. In further embodiments, the analyzer may still analyze such a flow, but filter out any positive results for flows associated with the address. In yet another embodiment, the above techniques can be used to train the DGA-based classifier to label a given traffic flow as benign, malicious, or onion routing-related.

Several experiments were conducted using the techniques herein and onion routing-related servers/addresses were identified with almost 100% precision. It was also observed that the precision is proportional to number of observed domains for each server IP.

In order to demonstrate the idea on real examples, a dataset of 612 server IPs and related domains were collected. At all of these server addresses, at least one domain was detected as a DGA-generated domain and at least five domains were registered and observed at each IP. If necessary, however, all server IPs could be monitored, since it is possible that a DGA-generated domain could be missed and, consequently, also miss a possible candidate for an onion routing-related server/address. Based on each of the histograms of domain character counts for each of the IP addresses in question, the Shannon entropy was computed.

Figure 7A:
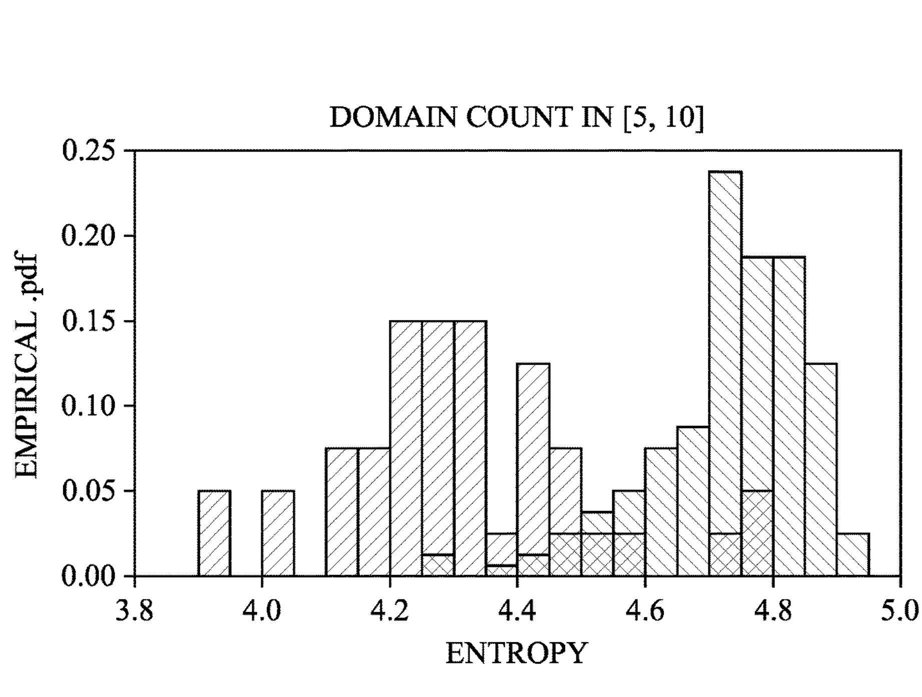
FIGS. 7A-7D illustrate example probability distribution functions (PDFs) for onion routing and non-onion routing traffic with a restricted number of assessed domain names.
Figure 7B:
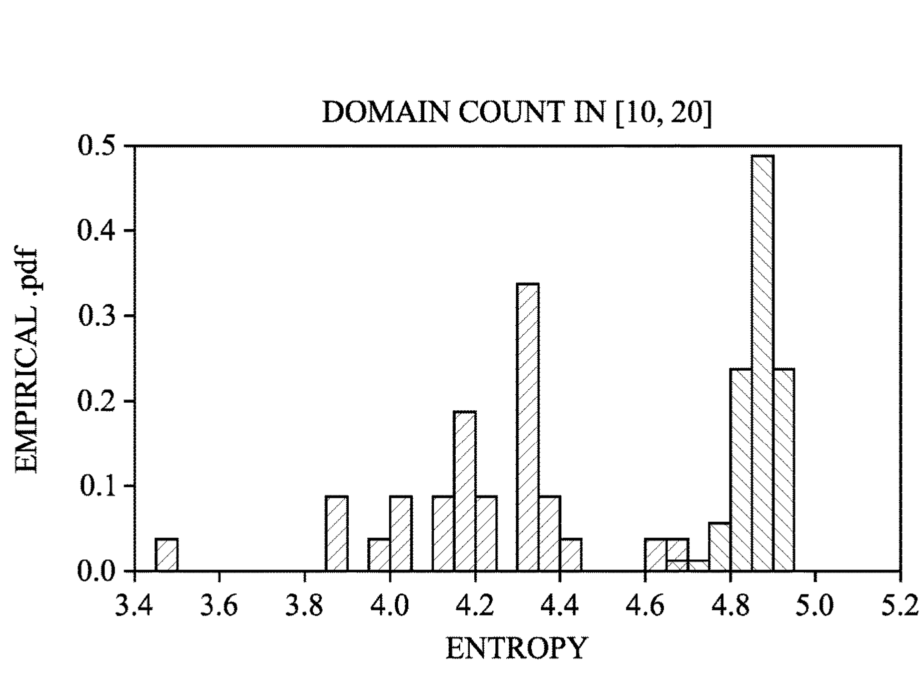
Figure 7C:
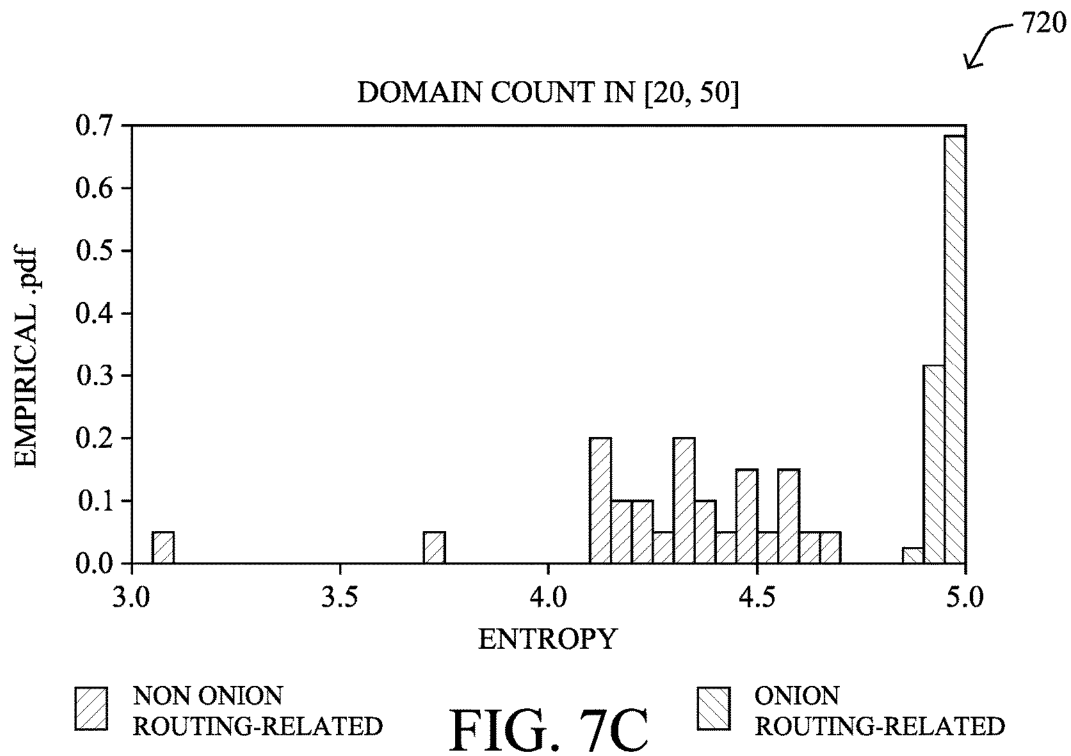
Figure 7D:
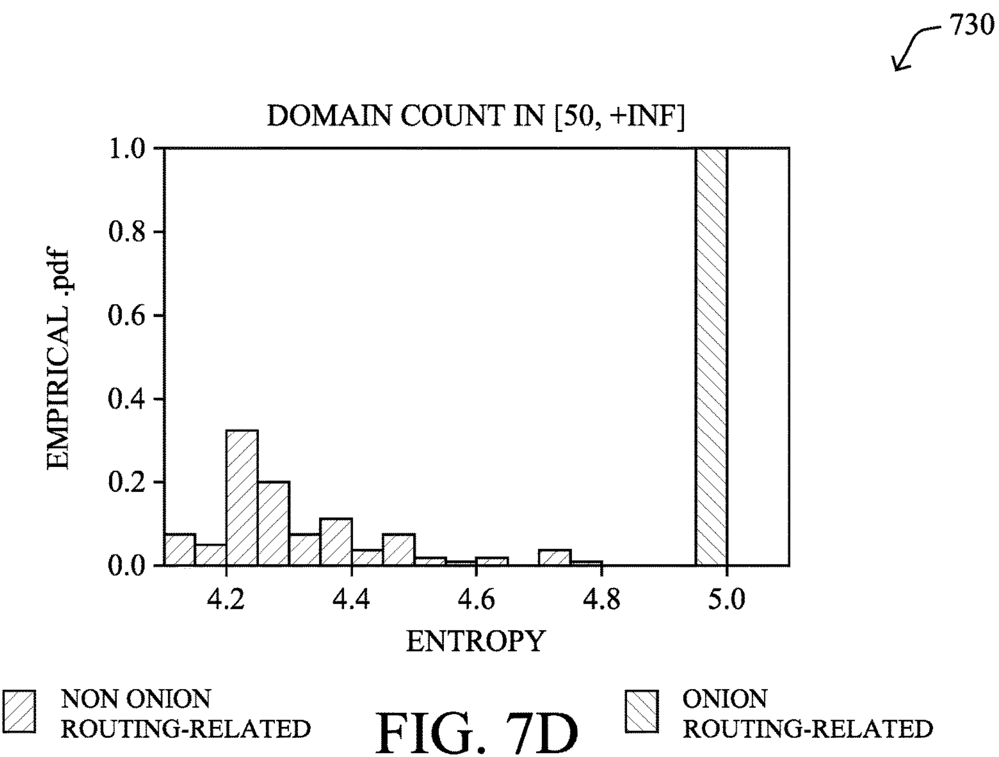

FIGS. 7A-7D illustrate example probability distribution functions (PDFs) for the tested onion routing and non-onion routing traffic. The tested dataset included 197 regular IP addresses and 415 onion routing-related addresses. Plot 700 in FIG. 7A illustrates the case where the count of domain names for each address is in the range of [5, 10). Plot 710 in FIG. 7B illustrates the case where the count of domain names for each address is in the range of [10, 20). Similarly, plot 720 in FIG. 7C illustrates the case where the count of domain names for each address is in the range of [20, 50). Finally, plot 730 in FIG. 7D illustrates the case in which each address has at least fifty associated domains.

The results show, that the techniques herein are able to identify an onion routing-related server/address with high precision, even for low number of observed domains, but at the cost of recall. This is the case for 5-10 observed domains, as shown in FIG. 7A. With increasing number of observed domains, however, the recall increases. In fact, the overlap between entropies computed for regular and onion routing-related addresses is very small already for 10 to 20 observed domains, as shown in FIG. 7B. With more than 20 observed domains, as shown in FIGS. 7C-7D, 100% recall and 100% precision was achieved.

Figure 8A:
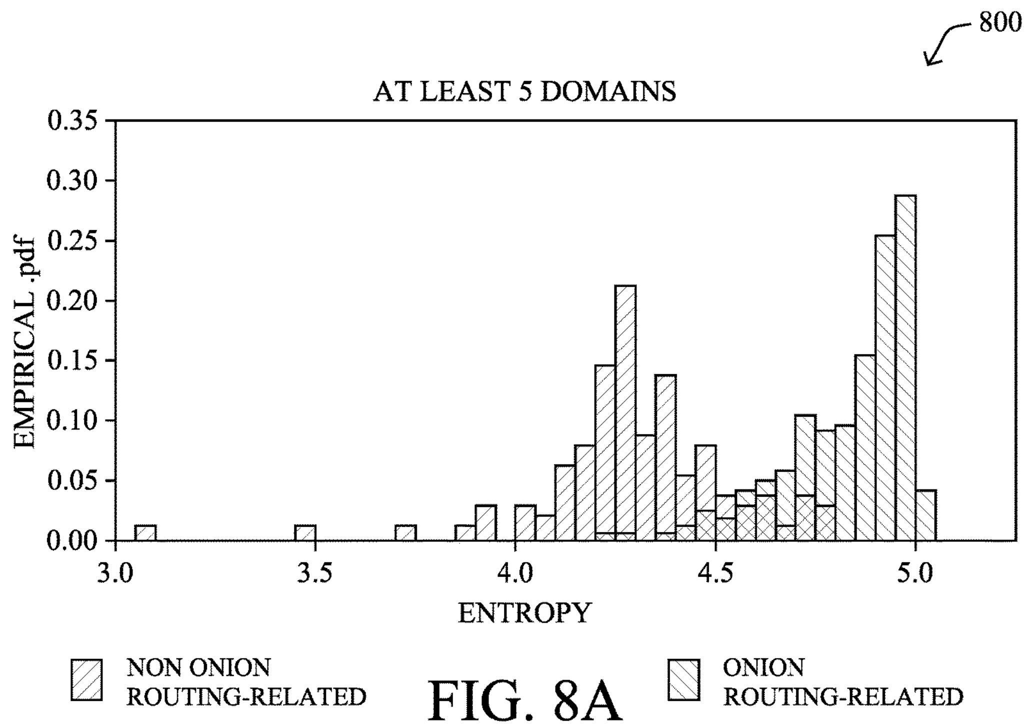
FIGS. 8A-8D illustrate example PDFs for onion routing and non-onion routing traffic with no restriction on the number of assessed domain names.
Figure 8B:
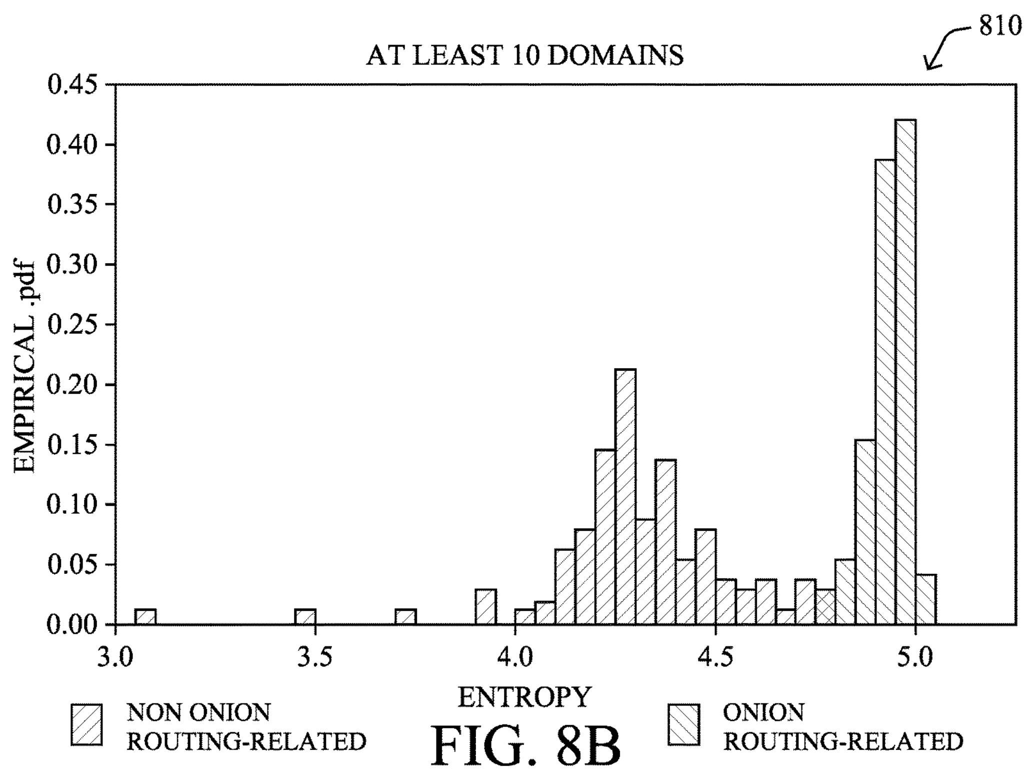
Figure 8C:
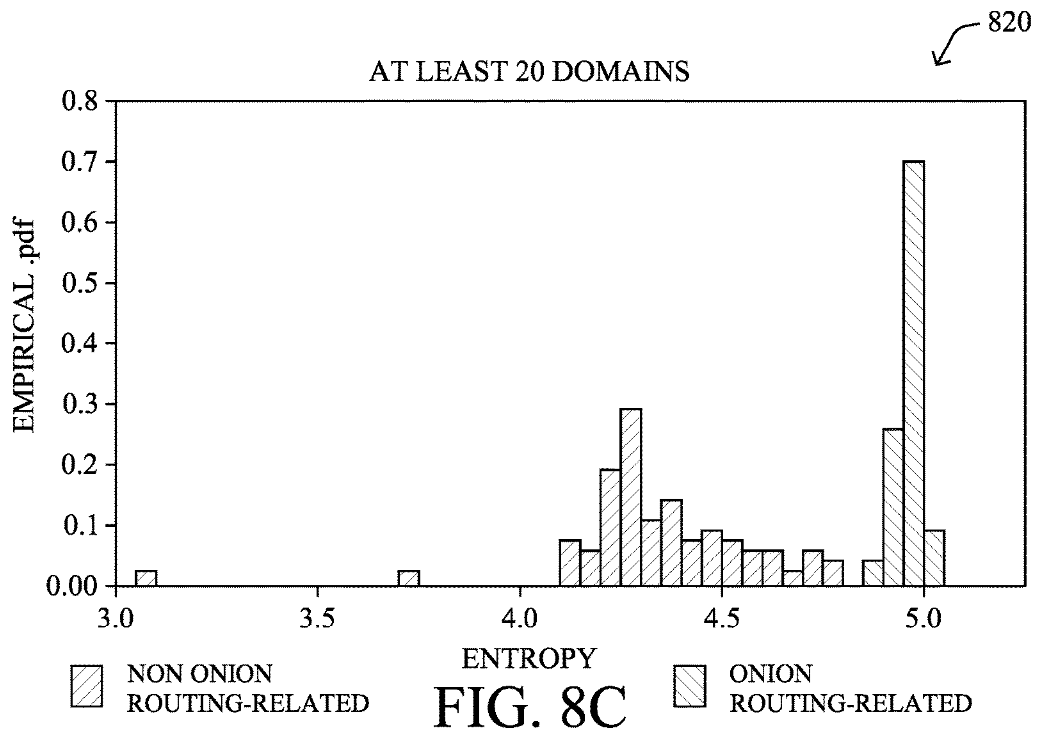
Figure 8D:
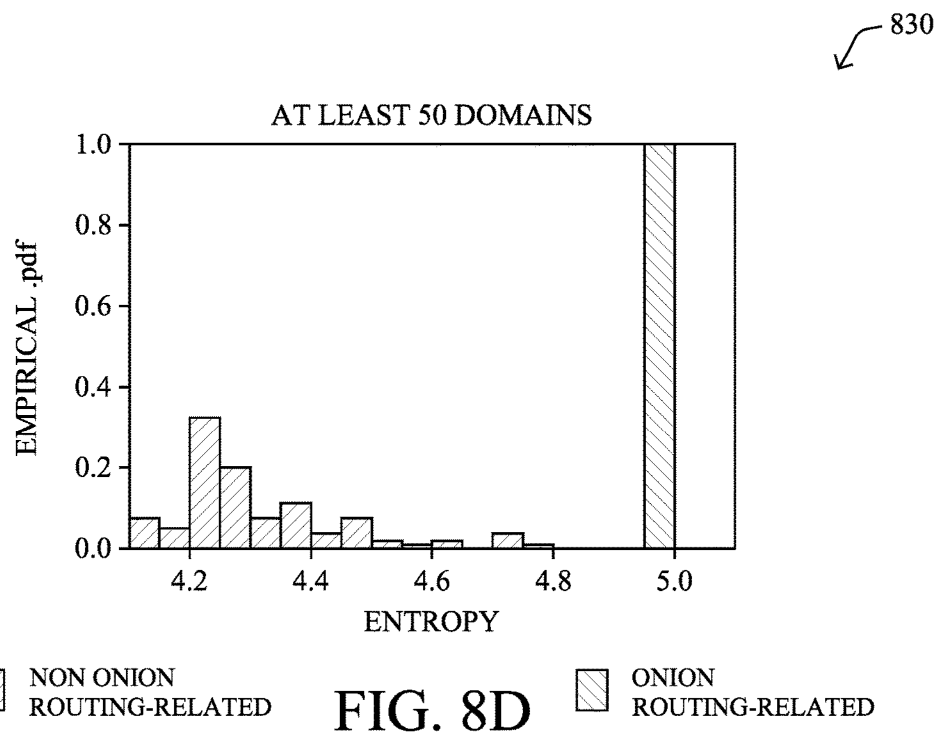

A further experiment was also conducted to remove the upper limit restriction on the observed domains per address/server. FIGS. 8A-8D illustrate the resulting PDFs. More specifically, plot 800 in FIG. 8A illustrates the case in which each address had at least five observed domains, with no upper limit on the number of domains. Plot 810 in FIG. 8B illustrates the case in which each address had at least ten domains with no upper limit restriction. Similarly, plot 820 in FIG. 8C illustrates the case in which each address had at least twenty domains with no upper limit restriction. Finally, plot 830 in FIG. 8D illustrates the case in which each address had at least fifty observed domains with no upper limit.

Again, it can be seen that a very high precision can be achieved even for the case in which only five domains per address were observed (e.g., for an entropy threshold higher than 4.8). Additionally, a high recall for the classifier is also achievable when at least ten domains are observed.

Figure 9:
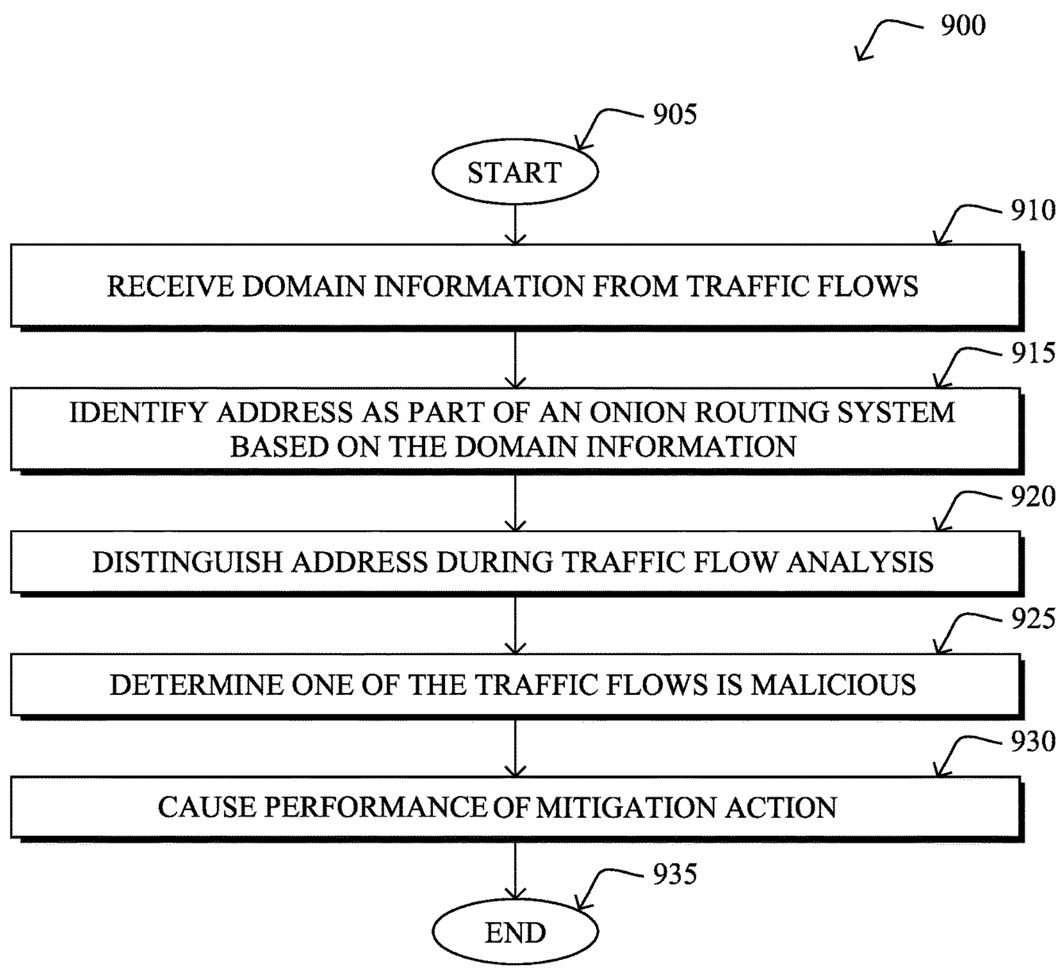
FIG. 9 illustrates an example simplified procedure for filtering onion routing traffic from domain generation algorithm (DGA)-based traffic classification.

FIG. 9 illustrates an example simplified procedure for filtering onion routing traffic from DGA-based traffic classification, in accordance with one or more embodiments described herein. For example, a non-generic, specifically configured device (e.g., device 200) may perform procedure 900 by executing stored instructions (e.g., processes 244, 248). The procedure 900 may start at step 905, and continues to step 910, where, as described in greater detail above, the device may receive domain information (e.g., domain names, etc.) from a plurality of traffic flows in the network. In some cases, the device may capture the information as the traffic flows through the device. In other embodiments, the device may receive the information from one or more other devices in the network that capture this information.

At step 910, as detailed above, the device may identify an address/server as part of an onion routing system based on the received domain information. For example, the device may determine whether a particular address is part of the TOR network. In some embodiments, the device may generate character counts for the domains associated with the address and assess the distribution of such counts, to determine whether the address is part of an onion routing system. For example, the device may compute a statistical distance between the distribution of character counts to that of a uniform distribution and compare the computed distance to a threshold. As discovered, the character counts of domain names at a specific server IP address may be more uniformly distributed for onion routing-related domains than for those that are not related to onion routing.

At step 915, the device may distinguish the address during analysis of the traffic flows by a traffic flow analyzer, as described in greater detail above. In one embodiment, the analysis may include assessing the traffic using a DGA-based traffic classifier. The device may, for example, exclude traffic for the address from analysis by the classifier, may adjust or filter a result of the classifier if traffic associated with the address is classified, or may even use a modified classifier that has a separate label for onion routing-related traffic (e.g., benign, malicious/malware, and onion routing-related).

At step 920, as detailed above, the device may determine that one of the traffic flows is malicious. For example, the DGA-based classifier may assess the domain for the traffic and determine that the traffic flow is associated with malware. By distinguishing onion routing-related addresses (e.g., as in step 915) during the analysis of the traffic flows, false positives are reduced (e.g., to ensure that the malware-related flow is actually related to malware).

At step 925, the device may cause the performance of a mitigation action based on the malicious traffic flow, as described in greater detail above. In some cases, the mitigation action may entail blocking the traffic flow or multiple traffic flows. In other cases, the mitigation action may entail generating an alert regarding the flow, such as to an administrator or to a supervisory device in the network. Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the dynamic detection of onion routing-related domains. Such detection can be achieved without the use of static lists and does not require any additional information other than the server IP address and the domain name(s) associated with the address. Further, the identified addresses that are onion routing-related can be used to reduce false positives in DGA-based malware detection systems.

While there have been shown and described illustrative embodiments that provide for dynamically identifying onion routing-based addresses, it is to be understood that various other adaptations and modifications may be made within the spirit and scope of the embodiments herein. For example, while certain embodiments are described herein with respect to using certain models for purposes of traffic analysis, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

receiving, at a device in a network, domain information from a plurality of traffic flows in the network;

identifying, by the device, a particular address from the plurality of traffic flows as part of an onion routing system based on the received domain information, wherein identifying the particular address as part of an onion routing system based on the received domain information comprises:

determining, by the device, character counts for each character that appear in domain names associated with the particular address in the received domain information, determining, by the device, a statistical distance between the character counts and a uniform distribution of character counts, and comparing, by the device, the statistical distance to a threshold value, to determine whether the particular address is part of an onion routing system;

distinguishing, by the device, the particular address during analysis of the traffic flows by a traffic flow analyzer that includes a domain generation algorithm (DGA)-based traffic classifier;

detecting, by the device, a malicious traffic flow from among the plurality of traffic flows using the traffic flow analyzer; and causing, by the device, performance of a mitigation action based on the detected malicious traffic flow.

2. The method as in claim 1, wherein the mitigation action comprises one of: generation of an alert regarding the malicious traffic flow or blocking the malicious traffic flow.

3. The method as in claim 1, wherein the onion routing system comprises The Onion Router (TOR) network.

4. The method as in claim 1, wherein receiving the domain information from the plurality of traffic flows comprises:

capturing, by the device, the domain information from the plurality of traffic flows.

5. The method as in claim 1, wherein the statistical distance is an entropy measurement of the character counts.

6. The method as in claim 1, further comprising:

constructing, by the device, a histogram based on the determined character counts.

7. The method as in claim 1, wherein distinguishing the particular address during analysis of the traffic flows by the traffic flow analyzer comprises at least one of:

preventing analysis of the traffic flows associated with the particular address by the DGA-based traffic classifier; or determining that a result of the DGA-based traffic classifier regarding a traffic flow associated with the particular address is a false positive.

8. The method as in claim 1, wherein the DGA-based traffic classifier is configured to label a traffic flow as benign, malicious, or related to an onion routing system.

9. An apparatus, comprising:

one or more network interfaces to communicate with a network;

a processor coupled to the network interfaces and configured to execute one or more processes; and a memory configured to store a process executable by the processor, the process when executed operable to:

receive domain information from a plurality of traffic flows in the network;

identify a particular address from the plurality of traffic flows as part of an onion routing system based on the received domain information, wherein the apparatus identifies the particular address as part of an onion routing system based on the received domain information by:

determining character counts for each character that appear in domain names associated with the particular address in the received domain information; and determining a statistical distance between the character counts and a uniform distribution of character counts; and comparing the statistical distance to a threshold value, to determine whether the particular address is part of an onion routing system;

distinguish the particular address during analysis of the traffic flows by a traffic flow analyzer that includes a domain generation algorithm (DGA)-based traffic classifier;

detect a malicious traffic flow from among the plurality of traffic flows using the traffic flow analyzer; and cause performance of a mitigation action based on the detected malicious traffic flow.

10. The apparatus as in claim 9, wherein the mitigation action comprises one of: generation of an alert regarding the malicious traffic flow or blocking the malicious traffic flow.

11. The apparatus as in claim 9, wherein the onion routing system comprises The Onion Router (TOR) network.

12. The apparatus as in claim 9, wherein the apparatus receives the domain information from the plurality of traffic flows by capturing the domain information from the plurality of traffic flows.

13. The apparatus as in claim 9, wherein the statistical distance is an entropy measurement of the character counts.

14. The apparatus as in claim 9, wherein the process when executed is further operable to:

construct a histogram based on the determined character counts.

15. The apparatus as in claim 9, wherein the apparatus distinguishes the particular address during analysis of the traffic flows by the traffic flow analyzer by at least one of:

preventing analysis of the traffic flows associated with the particular address by the DGA-based traffic classifier; or determining that a result of the DGA-based traffic classifier regarding a traffic flow associated with the particular address is a false positive.

16. The apparatus as in claim 9, wherein the DGA-based traffic classifier is configured to label a traffic flow as benign, malicious, or related to an onion routing system.

17. A tangible, non-transitory, computer-readable medium storing program instructions that cause a device in a network to execute a process comprising:

receiving, at the device, domain information from a plurality of traffic flows in the network;

identifying, by the device, a particular address from the plurality of traffic flows as part of an onion routing system based on the received domain information, wherein identifying the particular address as part of an onion routing system based on the received domain information comprises:

determining, by the device, character counts for each character that appear in domain names associated with the particular address in the received domain information, determining, by the device, a statistical distance between the character counts and a uniform distribution of character counts, and comparing, by the device, the statistical distance to a threshold value, to determine whether the particular address is part of an onion routing system;

distinguishing, by the device, the particular address during analysis of the traffic flows by a traffic flow analyzer that includes a domain generation algorithm (DGA)-based traffic classifier;

detecting, by the device, a malicious traffic flow from among the plurality of traffic flows using the traffic flow analyzer; and causing, by the device, performance of a mitigation action based on the detected malicious traffic flow.

18. The tangible, non-transitory, computer-readable medium as in claim 17, wherein the statistical distance is an entropy measurement of the character counts.

19. The tangible, non-transitory, computer-readable medium as in claim 17, wherein the process when executed is further operable to:

construct a histogram based on the determined character counts.

20. The tangible, non-transitory, computer-readable medium as in claim 17, wherein the process distinguishes the particular address during analysis of the traffic flows by the traffic flow analyzer by at least one of:

preventing analysis of the traffic flows associated with the particular address by the DGA-based traffic classifier; or determining that a result of the DGA-based traffic classifier regarding a traffic flow associated with the particular address is a false positive.

* * * * *